Oct. 28, 1969   C. L. COLDREN ET AL   3,474,806
IN SITU PIPELINE HEAT GENERATION

Filed Sept. 8, 1967   2 Sheets-Sheet 1

INVENTORS:
CLARKE L. COLDREN
PAUL T. CHU
BY: *Louis J Bovasso*
THEIR ATTORNEY

Oct. 28, 1969  C. L. COLDREN ET AL  3,474,806
IN SITU PIPELINE HEAT GENERATION
Filed Sept. 8, 1967  2 Sheets-Sheet 2

INVENTORS:
CLARKE L. COLDREN
PAUL T. CHU
BY: *Louis J. Bovasso*

THEIR ATTORNEY

United States Patent Office 3,474,806
Patented Oct. 28, 1969

3,474,806
IN SITU PIPELINE HEAT GENERATION
Clarke L. Coldren, Westport, Conn., and Paul T. Chu, Peekskill, N.Y., assignors to Shell Oil Company, New York, N.Y., a corporation of Delaware
Filed Sept. 8, 1967, Ser. No. 666,428
Int. Cl. F17d 1/18; F24j 1/00
U.S. Cl. 137—13                                    23 Claims

ABSTRACT OF THE DISCLOSURE

The viscosity of a fluid flow stream in a pipeline is altered by placing fluid material reactive with the flow stream fluid to alter the temperature of the fluid in a fluid-containing vehicle. The vehicle is placed in the pipeline and propelled through the pipeline by the fluid flow stream. The fluid material in the vehicle is selectively released into the flow stream for reaction therewith.

BACKGROUND OF THE INVENTION

Field of the invention

This invention relates to an apparatus and method for chemically heating or cooling fluids flowing in pipelines, and, more particularly, to viscosity control through in situ thermal energy exchange by chemically reacting a portion of the fluid flowing in a pipeline with a selected reactant.

Description of the prior art

Vast networks of pipelines, particularly in the southwestern portion of the United States, provide means for the transmission of petroleum crudes from production areas to refineries or transportation facilities. Similar pipelines also crisscross the other portions of the United States carrying, in addition to petroleum crudes, many other fluids, and in some cases fluid-solid mixtures.

Whether pipelines are used for the transmission of petroleum crudes, other fluids, or fluid-solid mixtures, a major expense in the transmission thereof is the pumping cost. From the following equation it can be seen that pumping cost in laminar flow will be proportional to the viscosity of the fluid.

$$\Delta P = \frac{32 L V v'}{g D^2}$$

In the Hagen-Poiseuille equation (above)
$\Delta P$ = pressure drop in lbs./sq. ft.
$V$ = velocity ft./sec.
$L$ = length of pipe in ft.
$v'$ = viscosity in lbs./ft./sec.
$g$ = acceleration of gravity in ft./sec./sec.
$D$ = diameter (inside) in ft.

From a perusal of the above equation it can be seen that the viscosity ($v'$) of the fluid being pumped through the pipeline plays a large role in determining the actual pumping cost. For example, if the viscosity doubles it will require twice the work to maintain a constant throughput. Likewise, it can also be shown that in turbulent flow, the viscosity of the fluid still plays an important role in determining pumping costs.

Since the viscosity of a given fluid is dependent upon the temperature of the fluid, even seasonal changes of temperature at the situs of a pipeline can considerably alter the pumping cost. For example, a seasonal temperature change of approximately 25° C. can change the viscosity of naphthalene from 3.3 centipoises at 25° C. to 7.5 centipoises at 0° C., resulting in a more than double increase in the pumping cost of naphthalene at the latter temperature.

In addition, there are some petroleum crudes in the United States, such as certain crudes in the State of Mississippi, which have extremely high viscosity and cannot be moved by pipelines without heating to lessen their viscosity. For example, Baxterville Oil has a viscosity of 17,400 Saybolt Universal Seconds (SUS) at 60° F. and a gravity of 16.4 API°, being almost a plastic semi-solid. In order to pump such a viscous crude through a large diameter pipeline, a minimum line temperature of 80° F. must be maintained and pressure as high as 1,000 p.s.i. may be required to achieve useful flow.

One technique to the transmission of viscous crudes, such as described above, is the use of oil heating equipment at pumping stations. Live steam boilers cooperating with heat exchangers can be used to provide the necessary heat to lower the viscosity of these crudes and make crudes like the Baxterville crudes pumpable. Of course, heating to improve pumpability is not limited to the highly viscous crudes mentioned previously and such boilers can be used to lower the viscosity of the less viscous crudes to achieve a reduction in pumping costs. Boilers employed in such techniques are usually fueled by natural gas or oil or a combination thereof; and, when working with viscous crudes, stand-by fuel supplies are a must since a failure of any boiler could be disastrous, allowing the crude to freeze in the pipeline. A notable example of a steam-heated pipeline is the 152-mile pipeline from Eucutta, Miss., to Mobile, Alabama, discussed in World Oil, March 1952, p. 214–216, in an article entitled, "Steam-Heated Pipeline." The article described a pipeline using 150 horsepower boilers, spaced at 9-mile intervals, to prevent the crude from freezing in the pipeline.

While such oil-heating equipment at pumping stations can provide the necessary heat to lower pumping cost and/or improve the pumpability of highly viscous fluids, they are not very efficient since the heat in the combustion unit cannot be fully transferred to the pipeline fluid. Furthermore, boiler and heat exchange equipment is often expensive and the costs of operation and maintenance can be considerable, often requiring a licensed operator. Further, the space between two heating units along the pipeline has to be large to minimize the number of units required. Thus, it is necessary that the crude be raised to a rather high temperature at each station in order to retain sufficient heat to reach the next heating unit. Of course, these high temperatures provide a large temperature differential ($\Delta T$) between the pipeline and the local surroundings resulting in high heat loss and extreme inefficiency.

SUMMARY OF THE INVENTION

It is an object of the present invention to provide a means for heating fluids in pipelines without heat exchange equipment, such as boilers and cooperating heat exchangers.

It is also an object of the present invention to provide a method whereby the temperature of a fluid in a pipeline can be maintained simply, economically and automatically.

Another object of the present invention is to optimize the operational efficiency of a pipeline carrying fluids having a relatively high viscosity variance over a relatively narrow temperature range by an in situ heat exchange process resulting from the chemical reaction of a portion of the fluid flowing therethrough with a selected reactant. The reactant is controllably introduced to the pipeline flow stream by controlled release from a reactant containing vehicle that is carried through the pipeline by the fluid flow stream.

One aspect of the present invention encompasses apparatus and a method for heat generation within pipelines having fluids containing an oxidizable fluid flowing therethrough by effecting in situ oxidation, for example, of a portion of the fluid as it flows through the pipeline. In this manner it is possible to add heat directly to the fluid by the exothermic oxidation reaction without the necessity of heat exchange equipment. More specifically, the invention relates to the apparatus and method for injecting an oxidant under circumstances which will cause an exothermic oxidation reaction to take place within the flowing fluid proper to add thermal energy to the fluid. This addition of heat will lower the viscosity and results in improved pumpability. The improved pumpability occurs because the pressure drop for movement of the fluid through the pipeline is proportional to its viscosity and the viscosity is inversely proportional to its temperature; thus, an increase in temperature intrinsically reduces pumping costs.

DESCRIPTION OF THE PREFERRED EMBODIMENT

Figure 1:
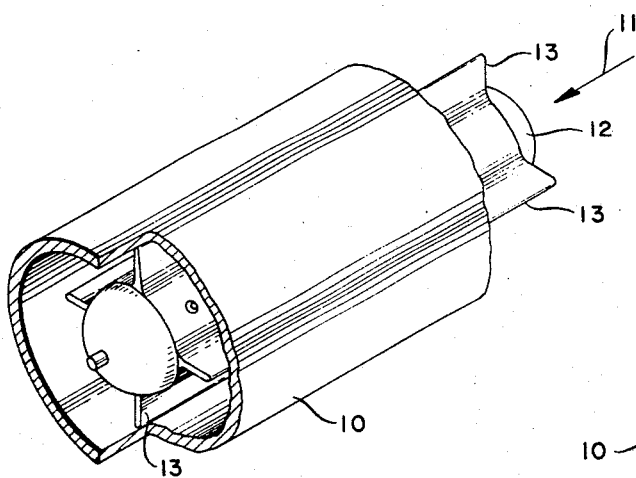
FIGURE 1 is a perspective section view of a pipeline including a reactant carrying vehicle in accordance with one embodiment of the invention.
Figure 2:
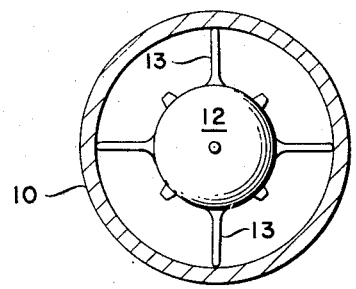
FIGURE 2 is a sectional end elevation view of the pipeline section shown in FIGURE 1.

Both method and apparatus of the invention for controlling the viscosity of flowing fluids by the in situ oxidation of the portion thereof can be better understood by referring to the figures. Basically, FIGURE 1 shows one embodiment of the apparatus which consists of cylindrical pipeline section 10. Carried within the pipeline 10 is a fluid flow stream having a direction of flow represented by the arrow 11. Although the following description of the invention is referenced to an oxidizable flow stream fluid it should be understood that the invention is not limited thereto.

Carried within the bore of the pipeline 10 and propelled therethrough is a fluid-containing vehicle in the form of a capsule or cylinder 12. The capsule in the FIGURE 1 embodiment may include stabilizing fins 13 which tend to prevent the capsule from spinning about the longitudinal axis.

Figure 7:
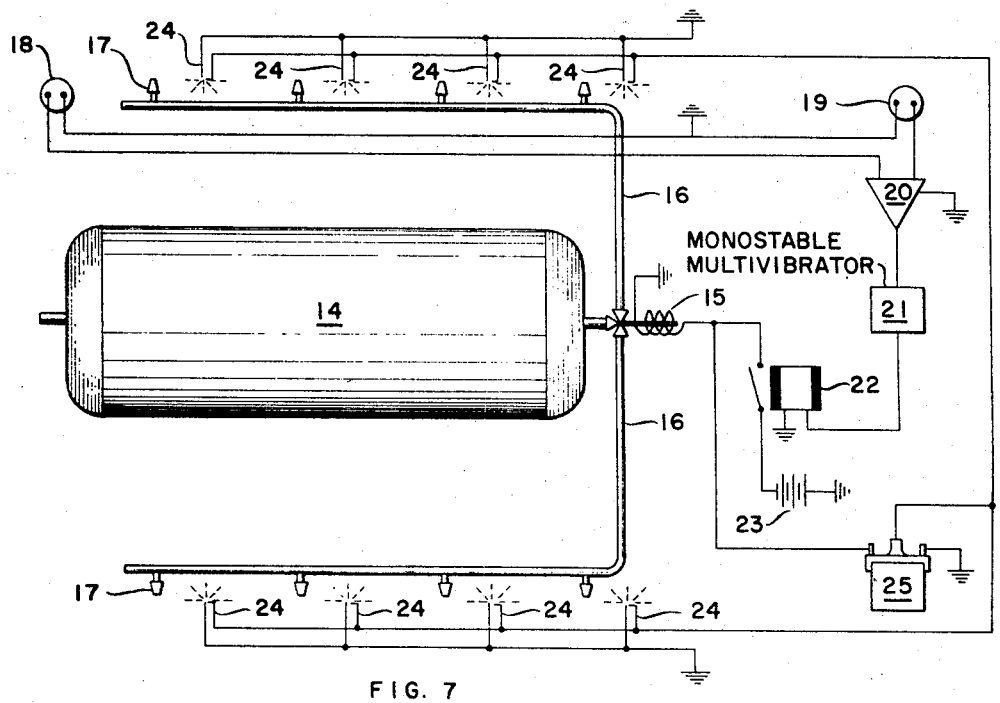
FIGURE 7 is a schematic diagram showing the fluid and electric control circuitry for a pressurized reactant container vessel embodiment of the invention.

Within the capsule 12 is a pressure chamber which contains a fluid reactant material which, in the case of an exothermal oxidation-reduction reaction with a crude oil flow stream, may be air or oxygen. With reference to FIGURE 7, a solenoid operated control valve 15 regulates the flow of reactant from the pressure chamber 14 into the manifold conduits 16 where it is discharged through the nozzles or orifices 17 into the fluid flow stream 11. In a very simplified version of the invention, a manually operated control valve may be used in place of the solenoid valve 15. In such a simplified version of the invention the capsule is merely placed in the flow stream to discharge reactant continuously as it travels therethrough.

In view of the mechanics of fluid flow in pipelines it will be understood that the fluid flow velocity will be greater in the center region of the pipeline bore than in the vicinity adjacent the pipe wall, the portion of the flow stream in contact with the pipe wall being static. Consequently, if the capsule cross-section is made smaller than the cross-sectional area of the pipe bore and is centered therein by the stabilizing fins 13, the capsule will be carried through the pipeline at a velocity greater than the net flow velocity of the flow stream. Furthermore, it is the portion of the flow stream adjacent the pipe wall that is subject to the greatest conductive heat transfer. Hence, it is throughout this radially outer layer of the flow stream that distribution of the reactant fluid is most effective.

Therefore, as the capsule is swept through the pipeline by the main flow stream, reactant fluid is discharged from the nozzles 17 into the outer flow stream layer where it exothermally, for example, reacts to chemically generate heat. Only a small percentage of the flow stream fluid is reduced, however, and the reduction thereof generates sufficient heat to reduce the viscosity of the non-reacted flow stream fluid. Knowing the rate of flow in the pipeline, kind of fluid flowing therethrough and temperature of the flow stream, the desired amount of heat can be generated by injecting a given amount of reactant into the fluid flow stream. Persons skilled in the art can easily calculate the necessary rate of reactant injection for achieving a certain temperature level, knowing the above factors, and set the control valve 15 appropriately.

The simplified version of the invention described above may be used in long lengths of pipeline where continuous heating is necessary.

In some instances there may be numerous but relatively short pipeline lengths where heating is necessary. In these cases the reactant fluid discharge may be controlled by a system schematically illustrated in FIGURE 7. In addition to the fluid pressure chamber 14 and solenoid control valve 15 in the manifold conduits 16, there are provided pressure-sensitive transducers 18 and 19. The pressure transducers 18 and 19 are located on opposite axial ends of the capsule 12 which may be five feet or longer in length. As the capsule is moved from a region of relatively low viscosity and uniformly high pressure to one of relatively high viscosity and low local pressure the respective output signals from the pressure transducers 18 and 19 are compared by a difference amplifier 20. When the difference between these two pressure transducers exceeds a certain predetermined value the difference amplifier 20 transmits an energizing signal to a monostable multivibrator 21 which in turn energizes a time delay relay 22. The time delay relay is normally biased in the open condition, i.e., the switch is open when the coil is not energized. When energized, however, the time delay relay 22 closes the circuit between a battery 23, for example, and the solenoid control valve 15.

In certain cases it may be necessary or expedient to provide ignition means to initiate a combustion reaction. One example of such a case is the use of oxygen to heat crude oil. Heating elements or spark plugs 24 are consequently provided in such an instance which are located on the downstream side of the discharge nozzles 17 relative to the outer layer of fluid past the capsule. To energize the ignitors 24 a spark coil is included and is energized by a circuit connected in parallel with the energizing coil 15.

As an alternative to the use of pressure transducers 18 and 19, a temperature sensing means may be used. The use of a temperature sensor is predicated on the usually inverse relationship between the viscosity of a fluid and its temperature.

Figure 3:
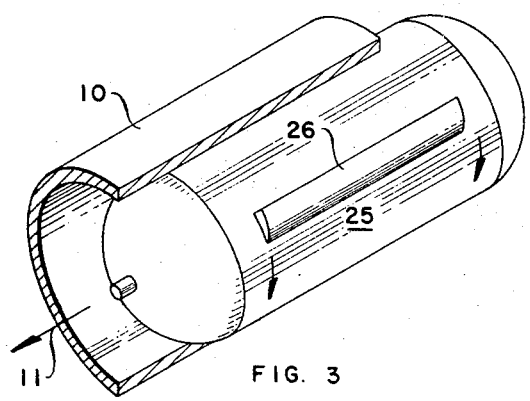
FIGURE 3 is a perspective section view of a pipeline including a reactant carrying vehicle in accordance with another embodiment of the invention.
Figure 4:
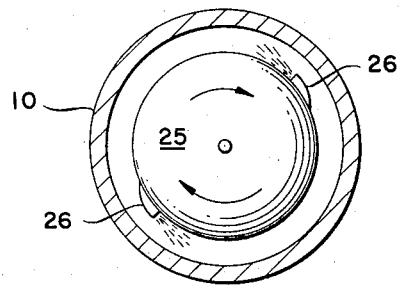
FIGURE 4 is a sectional end elevation view of the pipeline section shown in FIGURE 3.

Depending on flow stream conditions and the particular flow stream involved, it may be more desirable to have greater mechanical mixing of the reactant with the pipeline fluid. The embodiment of FIGURES 3 and 4 provides such mixing by allowing the reactant fluid to discharge tangentially from longitudinal slits 26 or rows of nozzles on the surface of the capsule 25, thereby inducing the spinning motion that the fins 13 of the FIGURE 1 embodiment are designed to prevent. Due to such spinning motion the reactant is dispersed more evenly about the circumference of the pipe wall as the capsule is carried axially along the pipe by the flow stream as explained above. Of course, the flow control and ignition means described with respect to FIGURE 7 are equally adaptable to the FIGURE 3 embodiment.

Figure 5:
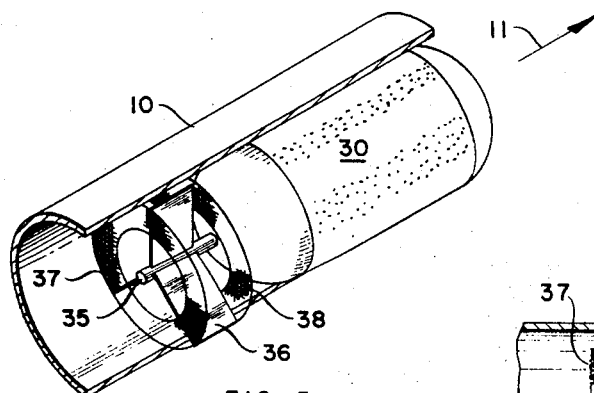
FIGURE 5 is a perspective section view of a pipeline including a third embodiment of the reactant carrying vehicle in accordance with the invention.

In FIGURE 5 there is shown a capsule 30 having a shaft 35 secured to the center thereof. From the trailing end of the capsule 30 the shaft 35 is extended to accommodate three radially projecting fins 36 which are secured to said shaft 35. To the leading and trailing edges of the fins 36 are catalyst rings 37 and 38, respectively. These catalyst rings are screens that are fabricated from catalyst element wire and have a mesh that is sufficiently open as to allow the reactant-flow stream fluid to pass therethrough.

Although the catalyst "tail" embodiment of the invention is shown in FIGUURES 5 and 6 as attached to capsule 30, an embodiment of the invention yet to be described, it should be understood that it may be combined with the pressure vessel embodiments illustrated in FIGURES 1 and 3.

Figure 6:
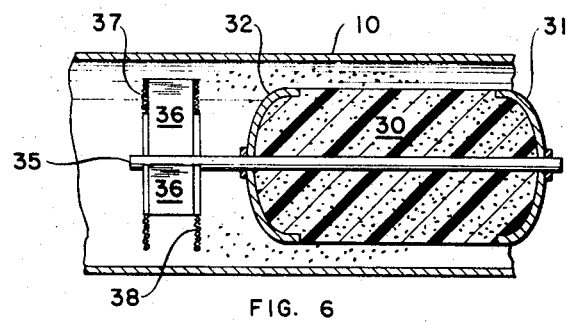
FIGURE 6 is a sectional side elevation view of the pipeline section shown in FIGURE 5.

The capsule 30 illustrated in FIGURES 5 and 6 represents still another embodiment of the invention as to a method and apparatus for combining the reactant with the flow stream fluid. The capsule 30 is a cylinder of inert porous material such as foamed polyethylene or polypropylene in which the interstitial spaces are in fluid communication. Since such materials are seldom of great structural strength, the porous body of the capsule 30 is capped and protected by metal caps 31 and 32. The caps 31 and 32 also limit the surface of the porous body exposed to the fluid flow stream to the circumferential periphery for reasons to become subsequently apparent.

Due to the porous nature of the capsule body 30, it may be caused to "absorb" a large quantity of reactant in the manner of a sponge. When placed in the flow stream, however the reactant will diffuse out from those pores located at the circumferential surface into the flow stream. Due to the permeability of the porous body, the reactant contained in the interior pores will migrate radially out to continuously replenish the outer surface pores and likewise diffuse into the flow stream. Simultaneously, the flow stream fluid will migrate radially inwardly to fill the pores as the reactant is dissipated.

Although the specification has been directed primarily to oxidation-reduction reactions with liquid crude oil, it should be understood that the inventive concept disclosed herein is not limited to such applications. For example, the invention may be used to maintain the temperature of molten sulfur in the pumpable range of between 240° F. and 300 F. by reacting a portion thereof with compressed oxygen in the manner described. Also, the reaction need not necessarily be an oxidative one since other reactions yielding a high thermal energy exchange may work with equal effectiveness. Furthermore, endothermal reactions are envisioned as well as exothermal ones and would have specific utility in reducing the temperature of gases to a more efficient compressible range or of liquefied petroleum gas to prevent the line vaporization.

From the foregoing it can be appreciated that the broad concept of this invention offers considerable advantages over the use of such fixed installation devices such as boilers and the like to heat the fluids flowing through pipelines.

We claim:

1. A method of altering the viscosity of a fluid flow stream in a pipeline comprising the steps of:
placing fluid material that is reactive with said flow stream fluid to alter the temperature of said fluid in a fluid-containing vehicle;
placing said vehicle in said pipeline;
propelling said vehicle through said pipeline by said fluid flow stream; and
selectively releasing said fluid material from said vehicle into areas of relatively high viscosity in said flow stream for reaction therewith, thereby lowering the overall viscosity of said flow stream.

2. A method as described by claim 1 wherein said reaction is an endothermal reaction to increase the viscosity of said flow stream.

3. A method as described by claim 1 wherein said reaction is an exothermal reaction to decrease the viscosity of said flow stream.

4. A method as described by claim 3 wherein said reaction is an oxidation-reduction reaction.

5. A method as described by claim 4 wherein said oxidation is promoted by ignition and combustion.

6. A method as described by claim 1 wherein said reaction is promoted by the presence of a catalyst.

7. A method as described by claim 1 wherein said fluid material is prepared by combining a reactant with a reaction promoting catalyst.

8. A method as described by claim 1 wherein said placing step includes absorption of said material by a porous vehicle and said selective release includes diffusion of said material into said flow stream from the surface of said porous vehicle.

9. A method as described by claim 1 wherein said step of placing said vehicle includes charging a pressure chambered vehicle with said fluid material and said selective release includes ejection of said fluid material into said flow stream.

10. A method as described by claim 9 wherein said selective release includes:
quantitatively sensing a fluid characteristic of said flow stream fluid; and
regulating said ejection in relation to the value of said sensed characteristic.

11. A method as described by claim 10 wherein said reaction is an oxidation reaction and comprising the additional step of discharging an electric spark to initiate said reaction.

12. Apparatus for altering the viscosity of a fluid flow stream in a pipeline comprising:
a fluid flow stream conducting pipeline;
a fluid containing vehicle adapted to be propelled through said pipeline by said flow stream;
a fluid material contained by said vehicle adapted to alter the temperature of said flow stream fluid by reacting therewith;
fluid discharge means for selectively discharging said material in said flow stream; and
said fluid containing vehicle comprising a substantitally cylindrically shaped capsule fabricated of an inert porous material having fluid communicative interstices, said fluid material being contained within said interstices and discharged by means of diffusion from those interstices located proximate of the outer surface of said capsule.

13. Apparatus as described by claim 12 wherein said fluid-containing vehicle is a substantial cylinder of porous polyethylene.

14. Apparatus as described by claim 12 wherein said fluid-containing vehicle is a substantial cylinder of porous polypropylene.

15. Apparatus as described by claim 12 wherein said capsule has catalyst ring means secured thereto, the fabrication of said ring means comprising material that is a catalyst as to a chemical reaction between said fluid material and said flow stream fluid.

16. Apparatus for altering the viscosity of a fluid flow stream in a pipeline system comprising:
a fluid flow stream conducting pipeline;
a fluid containing vehicle adapted to be propelled through said pipeline by said flow stream;
a fluid material contained by said vehicle adapted to alter the temperature of said flow stream fluid by reacting therewith;
fluid discharge means for selectively discharging said material into said flow stream;
said fluid-containing vehicle comprising a substantially cylindrically shaped capsule;
said capsule comprising pressure chamber means therein with said fluid material contained within said pressure chamber means;

said fluid discharge means comprising fluid conduit means interconnecting said pressure chamber means and the space surrounding said capsule for conducting said fluid material from said pressure chamber means to said fluid flow stream;

sensing means for quantitatively sensing a fluid characteristic of said flow stream relative to said flow stream viscosity; and converter means responsive to said sensing means for regulating said fluid material flow through said fluid conduit means.

17. Apparatus as described by claim 16 wherein said sensing means comprises at least two pressure sensing means at spaced locations along the length of said capsule and including means to determine the pressure differential at said pressure sensing means locations and transmit control signals to said converter means when said pressure differential exceeds a predetermined value.

18. Apparatus as described by claim 16 wherein said sensing means comprises flow stream fluid temperature sensing means and monitoring means to transmit control signals to said converter means when said flow stream fluid temperature falls below a predetermined value.

19. Apparatus as described by claim 16 wherein said fluid conduit means comprise fluid discharge nozzles located around the circumferential surface of said capsule and directed radially therefrom.

20. Apparatus as described by claim 16 wherein said fluid conduit means comprise fluid discharge nozzles located on the circumferential surface of said capsule and directed tangentially therefrom.

21. Apparatus as described by claim 16 wherein said capsule has catalyst ring means secured thereto, the fabrication of said ring means comprising material that is a catalyst as to a chemical reaction between said fluid material and said flow stream fluid.

22. A method of altering the viscosity of a fluid flow stream in a pipeline comprising the steps of:

placing fluid material that is reactive with said flow stream fluid to alter the temperature of said fluid in a fluid-containing vehicle;

placing said vehicle in said pipeline;

propelling said vehicle through said pipeline by said fluid flow stream; and selectively releasing said fluid material from said vehicle into said flow stream for reaction therewith by quantitatively sensing a fluid characteristic of said flow stream fluid; and regulating said ejection in relation to the value of said sensed characteristic.

23. A method as described by claim 22 wherein said reaction is an oxidation reaction and comprising the additional step of discharging an electric spark to initiate said reaction.

References Cited
UNITED STATES PATENTS

| | | | |
|---|---|---|---|
| 1,679,432 | 8/1928 | Lyon | 44—3 |
| 2,010,800 | 8/1935 | Adams | 44—3 XR |
| 2,657,753 | 11/1953 | Carpenter | 166—39 |
| 2,824,611 | 2/1958 | Burch | 166—57 |
| 2,953,205 | 9/1960 | Carr | 166—39 XR |
| 3,216,435 | 11/1965 | Poettmann | 137—268 XR |

ROBERT G. NILSON, Primary Examiner

U.S. Cl. X.R.

15—104.06; 122—21; 126—263; 137—268, 334